United States Patent Office 2,863,900
Patented Dec. 9, 1958

2,863,900

SYNTHESIS OF ORGANIC PHOSPHORUS COMPOUNDS

Leland K. Beach, Mountainside, and Robert Drogin, Linden, N. J., assignors to Esso Research and Engineering Company, a corporation of Delaware No Drawing. Application April 8, 1953
Serial No. 347,622

10 Claims. (Cl. 260—461)

This invention relates to the manufacture of organic intermediates and more particularly to the production of alkyl phosphonic acid derivatives which are useful in the synthesis of organic phosphorus compounds.

The phosphonic acid derivatives which are of interest have the general structure:

where R is a radical such as methyl, phenyl, or such organic group and where X and Y may be hydroxyl, organic groups such as methoxyl or another phosphorus compound such as:

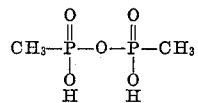

or where X or Y may be other negative groups.

A more specific object of this invention is the production of methane phosphonic acid derivatives from dimethyl hydrogen phosphite (DMHP) by means of a catalytic rearrangement.

Specifically this invention involves the newly discovered improvement in the thermal rearrangement of DMHP brought about by the use of $BF_3$, a boron fluoride complex type catalyst, or an equivalent catalyst described as a $BF_3$ type catalyst.

The preparation of alkyl phosphonic acid derivatives commonly involves treating a trialkyl phosphite with a primary alkyl halide such as methyl iodide;

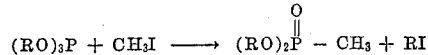

This is called the Arbusov reaction. Although this reaction is almost 100% efficient and very rapid at moderate temperatures it is expensive due both to the use and recovery of the iodide and also to the use of trialkyl phosphite.

For example, trimethyl phosphite is made by reacting three moles of methanol with one mole of phosphorus trichloride in the presence of at least three moles of a base such as diethylaniline. The reaction is expressed as follows:

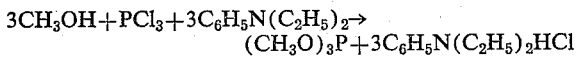

The use of the base is a large item of expense. The yields with the base are frequently below 50%, and the operation is difficult, involving filtration and removal of large quantities of solvent.

On the other hand DMHP can be made from methanol and $PCl_3$ without the use of base according to the equation:

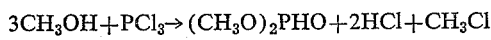

The yields by this process are much higher than those for trimethyl phosphite. The operation is relatively simple.

The complete thermal rearrangement of DMHP gives roughly 75 mole percent yields of various methane phosphonic acid derivatives having the structure,

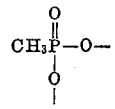

in common. This step is considerably less efficient than the last step of the alternate synthesis from the trialkyl phosphite via the Arbusov reaction. It also requires higher temperatures, longer times, and involves the handling of very corrosive material.

There is considerable incentive for obtaining yields above the 75% given by the thermal rearrangement.

As a result of studies of this thermal rearrangement, there have been investigated for catalytic activity many compounds, such as $AlCl_3$, toluene sulfonic acid pyromethane phosphonic acid, sodium methoxide, methyl sulfate, sulfuric acid, pyridine and others. Of the catalysts studied, those most closely related to $BF_3$, or its complexes, were found to be unusually beneficial.

In the process of the present invention, the use of less than 10 wt. percent, preferably less than 1 wt. percent of $BF_3$, allows the DMHP rearrangement reaction to be carried out at lower temperatures, with less corrosion, and with higher yields of the desired products.

$BF_3$ has been discovered, in accordance with the present invention, to catalyze especially the reaction:

This reaction produces no phosphates. One mode of operation is to carry the reaction no farther than to that point at which secondary reactions adversely affect the yield. The partially converted mixture is then treated to separate out pure DMMP which has the desired structure. The unconverted DMHP may be recycled. The "Mono" product, monomethyl phosphite, may be converted back to DMHP.

Phosphates, formed by secondary reactions are undesirable because they are difficult to remove. If not removed they produce undesirable phosphate impurities when the methane phosphonic acid derivatives are further processed. In addition to this role as impurities, their presence indicates a loss in yield of the desired methane phosphonic structure.

An alternate more simple mode of operation involves pyrolyzing the $BF_3$—DMHP starting mixture at an elevated temperature, such as 160°–200° C., to about 80% phosphite conversion and then finishing up at a still higher temperature, such as 225° C. Although some undesirable products, especially phosphates, are formed by this mode of operation their amounts are much lower than if no $BF_3$ were used. These and other facts are made more clear by the following examples.

Example 1.—*Thermal 2-stage rearrangement with no $BF_3$ catalyst*

DMHP was heated 42 hours at 181° C. and then 1 hour at 250° C. The resulting product contained 0.2 mole percent of total phosphorus in the form of unconverted phosphite and 12% in the form of phosphates.

Example 2.—*2-stage rearrangement with $BF_3$ catalyst*

DMHP containing 1.2 wt. percent $BF_3$ was heated 37 hours at 181° C. and then 1 hour at 250° C. The resulting product contained 1.2 mole percent phosphorus in the form of unconverted phosphite but only 9% in the form of phosphates.

*Example 3.—Reaction rate—Without* $BF_3$ *catalyst*

DMHP was heated 4 hours at 160° C. at which time only 9% DMHP and 4% of total phosphite were converted to other products. About 0.1 mole percent phosphate was formed along with about 5 mole percent each of mono methyl phosphite and dimethyl methane phosphonate.

*Example 4.—Reaction rate—With* $BF_3$ *catalyst*

DMHP containing 1.2 mole percent (0.7 wt. percent) $BF_3$ was heated 38 minutes at 160° C. At this time 32% of DMHP and 16% of total phosphite were converted. Only about 0.025 mole percent phosphate was formed along with about 17% of mono methyl phosphite and 13% of dimethyl methane phosphonate.

*Example 5.—Reaction rate—With* $BF_3$ *catalyst*

Example 4 was continued to 4 hours at which time 52% of the DMHP and 28% of total phosphite had been converted. At that time only 0.8 mole percent phosphate had been formed along with 27 mole percent of methane phosphonic acid derivatives.

*Example 6.—One stage—High temperature without* $BF_3$

Crude DMHP was completely pyrolyzed at a temperature up to about 240° C. max. The final product contained about 77 mole percent of methane phosphonic acid derivatives and about 17 mole percent phosphates.

*Example 7.—One stage—High temperature with* $BF_3$

Crude DMHP containing 0.9 wt. percent $BF_3$ was completely pyrolyzed over a 3.7 hour period by refluxing to a maximum temperature of about 240° C. The product contained about 85% of the desired methane phosphonic acid derivatives and about 11 mole percent phosphates.

Examples 1–5 above show how $BF_3$ increases tremendously the initial rate of pyrolysis giving also less of the undesirable phosphate as by-product at any given conversion level. Examples 6 and 7 show how at complete phosphite conversion the use of less than 1% $BF_3$ results in an approximately 8% increase in yield of desired product with less undesired phosphate product. These results are tabulated below:

| Example | Temp., °C. | Hours | Wt. Percent $BF_3$ | Phosphite Converted, mole percent | Phosphate Formed, mole percent |
|---|---|---|---|---|---|
| 1 | 181 / 250 | 37–42 / 1 | 0 / 0 | 99.7 | 12 |
| 2 | 181 / 250 | 37–42 / 1 | 1.2 / 1.2 | 98.8 | 9 |
| 3 | 160 | 4 | 0 | 4 | 0.1 |
| 4 | 160 | 38 min | 0.7 | 16 | 0.025 |
| 5 | 160 | 4 | 0.7 | 28 | 0.8 |
| 6 | 240 max | 4.5 | 0 | 99 | 17 |
| 7 | 240 max | 3.7 | 0.9 | 97 | 11 |

Besides the batch method of pyrolysis there are the two or three stage methods, continuous methods, and others which may be used with benefits of the $BF_3$ type catalyst.

It is seen from the examples that a desirable mode of operation is a relatively low temperature (below about 200° C.) soaking of DMHP in the presence of $BF_3$ in a batch or continuous operation followed by a higher temperature batch, continuous batch or continuous operation to arrive at closer to complete conversion of the phosphite. This may involve simply heating a batch at two different temperatures or may involve a simple continuous feed to a series of enclosed cascading or connected batch reactors or it may involve a continuous coil operation. In such an operation the phosphonic acid derivatives produced may be recirculated back to an initial stage to be mixed with the $BF_3$ catalyst and the phosphite feed. The phosphite feed may have been previously partially converted in the presence of $BF_3$.

The temperature for the first stage is usually below 200° C. and in the second stage is usually above 220° C. The times of reaction vary with the amount of catalyst and pressure used and the temperature.

Diluents, such as dimethyl ether, may be used but they seem to offer no great advantage chemically. Small amounts of oxygenated compounds may be employed as promoters or components of the catalyst, as in the form of complexes.

In the broader, but not limiting conception, $BF_3$ acts to cause alkylation of a central phosphorus atom by forming a complex with the phosphite, thus making it readily susceptible to this alkylation. For example, boron trifluoride forms a complex with dimethyl hydrogen phosphite, this complex then acting as a catalyst for further reaction. A product of this alkylation is the formation of a mono alkyl phosphite. When the diester is consumed to a point where its bimolecular reaction is very slow, temperature promotes the alkylation of the phosphorus atom in the mono alkyl phosphite. Side and consecutive reactions such as the formation of phosphorous acid and its decomposition to phosphoric acid and phosphine derivatives are not catalyzed by $BF_3$ although they proceed during the $BF_3$ catalyzed reaction.

The separation of an intermediate reaction product into its components, i. e., dimethyl phosphite, dimethyl methane phosphonate and monomethyl phosphite may be accomplished by selective absorption, solvent extraction, extractive or azeotropic distillation. A favored method for obtaining pure dimethyl methane phosphonate involves first a vacuum distillation under about 10 mm. Hg, whereby this compound and unconverted feed are taken overhead. This distillate then may be subjected to extractive distillation under reduced pressure in the presence of a hydrocarbon or other suitable third component whereby it is recovered in the bottoms and removed in a pure state by stripping.

The invention is claimed as follows:

1. A catalyst which consists in a complex of dimethyl hydrogen phosphite with boron trifluoride.

2. A catalytic process for producing methane phosphonic acid derivatives which comprises heating dimethyl hydrogen phosphite in the presence of $BF_3$ catalyst at temperatures in the range of 160° to 250° C.

3. A catalytic process of converting dimethyl hydrogen phosphite to dimethyl methane phosphonate, which comprises reacting the phosphite in the presence of a $BF_3$ catalyst at a temperature from about 160° to about 200° C.

4. A catalytic process of converting dimethyl methyl hydrogen phosphite to methane phosphonic acid and its derivatives which comprises reacting the phosphite in the presence of boron trifluoride at about 160° to 200° C. until a substantial amount of the phosphite is converted to methane phosphonic acid derivatives, and heating the resulting mixture to a temperature above 220° C. until remaining phosphites in said mixture are converted to more of said methane phosphonic acid derivatives.

5. A catalyst for the alkylation of an organic phosphite consisting in a mixture of dimethyl hydrogen phosphite and boron fluoride.

6. A process for preparing an alkyl phosphonic acid derivative of dimethyl hydrogen phosphite, which comprises mixing the phosphite with $BF_3$ and heating the resulting mixture to a temperature of about 160° to about 250° C. until a substantial amount of the phosphite is converted into phosphonate.

7. A catalytic process for producing phosphonic acid derivatives which comprises heating crude dimethyl hydrogen phosphite in the presence of $BF_3$ to temperatures of about 160° to 250° C. until a substantial amount of the phosphite is converted into phosphonate.

8. A catalytic process for converting an organic phosphite to phosphonates which comprises reacting dimethyl hydrogen phosphite in the presence of $BF_3$ at a temperature from about 160° to about 200° C. until a substantial amount of the initial phosphite is converted to phosphonate and heating the resulting reaction mixture to a temperature above about 220° C. until remaining phosphites in said mixture are converted to phosphonate products.

9. A catalytic process of converting an organic phosphite to phosphonic acid and derivatives including phosphonates which comprises admixing dimethyl hydrogen phosphite and $BF_3$ catalyst with hot phosphonic acid derivatives subsequently produced to form a reaction mixture, heating the reaction mixture to a temperature above 220° C. until remaining phosphites are converted to form said hot phosphonic acid derivatives.

10. A process as described in claim 9, wherein $BF_3$ is first added to the phosphite which is then partly reacted therewith before admixing with the hot phosphonic acid derivatives.

References Cited in the file of this patent

UNITED STATES PATENTS

| | | |
|---|---|---|
| 2,397,422 | Kosolopoff | Mar. 26, 1946 |
| 2,425,839 | Schulze et al. | Aug. 19, 1947 |
| 2,436,141 | Goebel | Feb. 17, 1948 |
| 2,492,994 | Harman et al. | Jan. 3, 1950 |
| 2,596,679 | Hagemeyer | May 13, 1952 |